United States Patent [19]
Chiaroni et al.

[11] Patent Number: 5,361,155
[45] Date of Patent: Nov. 1, 1994

[54] OPTICAL FILTER TUNED BY ROTATION AND COMPRISING A FABRY-PEROT INTERFEROMETER

[75] Inventors: Dominique Chiaroni, Antony; Paulette Morin, Saint Michel sur Orge, both of France

[73] Assignee: Alcatel Cit, Paris, France

[21] Appl. No.: 35,793

[22] Filed: Mar. 23, 1993

[30] Foreign Application Priority Data

Mar. 26, 1992 [FR] France ............................ 92 03680

[51] Int. Cl.$^5$ ............................................. H04J 14/02
[52] U.S. Cl. .................................... 359/131; 319/182; 319/722
[58] Field of Search ............... 359/124, 131, 154, 173, 359/182, 188, 195, 245, 722, 885; 385/74

[56] References Cited

U.S. PATENT DOCUMENTS

| | | | |
|---|---|---|---|
| 4,561,119 | 12/1985 | Epworth | 359/173 |
| 4,712,862 | 12/1987 | Lightstone | 385/73 |
| 4,813,756 | 3/1989 | Frenkel et al. | 385/73 |
| 5,227,908 | 7/1993 | Henmi | 359/154 |

FOREIGN PATENT DOCUMENTS

| | | | |
|---|---|---|---|
| 0315131 | 5/1989 | European Pat. Off. | |
| 2107147 | 4/1983 | United Kingdom | 359/182 |
| 2237468 | 5/1991 | United Kingdom | 359/182 |
| 2237469 | 5/1991 | United Kingdom | 359/182 |

OTHER PUBLICATIONS

Journal of Lightwave Technology, vol. 7, No. 4, Apr. 1989, New York, USA, pp. 615–624, Frenkel et al.: "Angle-tuned etalon filters for optical channel selection in high density wavelength division multiplexed systems".

Applied Optics, vol. 26, No. 3, Feb. 1, 1987, New York, USA, pp. 430–436, Mallinson S.: "Wavelength-selective filters for single-mode fiber WDM systems using Fabry–Perot interferometers".

*Primary Examiner*—Richard E. Chilcot, Jr.
*Assistant Examiner*—Kinfe-Michael Negash
*Attorney, Agent, or Firm*—Sughrue, Mion, Zinn, Macpeak & Seas

[57] ABSTRACT

A rotation tuned optical filter comprises a Fabry-Perot type interferometer disposed between an optical source and an optical receiver. The interferometer filters an input optical signal from the optical source. The input optical signal propagates substantially in a single mode. The interferometer supplies a filtered optical signal to the optical receiver which comprises a receiving surface which integrates the power density of the filtered optical signal. The filter comprises means for modifying the position of the filtered optical signal relative to the receiving surface of the optical receiver.

8 Claims, 4 Drawing Sheets

OPTICAL FILTER TUNED BY ROTATION AND COMPRISING A FABRY-PEROT INTERFEROMETER

BACKGROUND OF THE INVENTION

1. Field of the Invention

The invention concerns optical signal transmission and in particular wavelength division demultiplexing. To be more precise, the invention concerns an optical filter tuned by rotation and comprising a Fabry-Perot type interferometer disposed in a collimated beam between an input optical fiber and an output optical fiber.

2. Description of the Prior Art

FIG. 1 shows the receive part of an optical transmission system comprising optical filters carrying out wavelength division demultiplexing. This figure and the following description explain the context in which a Fabry-Perot type interferometer can be used.

An optical fiber 10 conveys a plurality of optical signals with respective wavelengths $\lambda_1, \lambda_2, \ldots \lambda_n$. Each optical signal is frequency or amplitude modulated by a different signal. A star coupler 11 is connected to the end of the optical fiber 10 and feeds the received optical signal to the same number of output fibers $12_1$ through $12_n$ each connected to the input of a tunable etalon filter $13_1$ through $13_n$. Each filter $13_1$ through $13_n$ is tuned to a different wavelength of the optical signal conveyed by the optical fiber 10 and, by analogy, would constitute a bandpass filter in the electrical domain. The filter $13_1$ is thus tuned to the wavelength $\lambda_1$, the filter $13_2$ to the wavelength $\lambda_2$ and the filter $13_n$ to the wavelength $\lambda_n$. Each filter feeds a filtered optical signal at a given wavelength to an optical receiver $14_1$ through $14_n$. The optical receivers $14_1$ through $14_n$ comprise a detector photodiode, for example, and means for shaping the detected signal producing a voltage proportional to the luminous intensity detected by the associated photodiode.

Each of the filters $13_1$ through $13_n$ may comprise a Fabry-Perot type interferometer tuned to a given optical wavelength and thus filtering the optical channel at this wavelength. In this way the filters carry out wavelength division demultiplexing.

The article "INLINE TUNABLE ETALON FILTER FOR OPTICAL CHANNEL SELECTION IN HIGH DENSITY WAVELENGTH DIVISION MULTIPLEXED FIBER SYSTEMS" by A. FRENKEL and C. LIN, BELL COMMUNICATIONS RESEARCH, ELECTRONIC LETTERS, Feb. 4, 1988, vol. 24, n°3 describes a Fabry-Perot interferometer of this kind applied to optical signal filtering. This interferometer is rotated to select one optical channel (one wavelength) from those constituting the input optical signal conveyed by an input optical fiber.

FIG. 2 in a diagram showing the theory of a rotation tuned optical filter of this kind using a Fabry-Perot type interferometer disposed between two coaxial optical fibers. The optical filter is the filter $13_1$ from FIG. 1, for example.

An input optical fiber 20 carries a composite signal, i.e. a plurality of optical signals at different wavelengths, this fiber being the fiber $12_1$ from FIG. 1, for example. The input fiber 20 has a silica core with a small enough diameter to transmit light in one mode only (monomode transmission). The end of the fiber 20 is glued to a collimator lens 21 producing a light beam parallel to the main axis 25 of the filter. A Fabry-Perot etalon 22 centered on the axis 25 is free to rotate about one of its axes which is not colinear with the wave vector to modify the optical path difference between two beams leaving the etalon 22 which is a thin plate of silica, for example, with a reflection treatment on both sides to meet predefined optical criteria.

The wavelength of the optical signal leaving the etalon 22 depends on the etalon rotation angle $\alpha$. A focussing lens 23 coaxial with the collimator lens 21 on the axis 25 concentrates the optical signal that it receives onto the core of an output optical fiber 24 which is usually identical to the input fiber 20. The focussing lens 23 concentrates the optical energy from the etalon 22 onto the core of the output optical fiber 24. The amount of energy integrated by the core of the output optical fiber 24 depends, among other things, on the numerical aperture of the fiber 24.

The maximum number of different wavelengths (channels) that can be filtered using a rotated interferometer depends, among other things, on the structure of the interferometer, i.e. its thickness and the surface treatment. The parallelism of the surfaces, their roughness and their flatness are also important. Allowance is also made for the numerical aperture of the output optical fiber 24.

An etalon consisting of a plate with treated surfaces is advantageously used in a static mode whereby each etalon of an optical transmission system has a given angular position in order to filter a particular optical channel. An etalon plate also shows much less parameter spread than Fabry-Perot filters comprising two air-spaced semi-reflecting plates. This latter type of filter is preferably used in a dynamic mode by displacing one plate relative to the other and requires a complex position control device which among other things must guarantee that the two semi-reflecting plates forming the cavity are perfectly parallel.

The rotation tuned Fabry-Perot interferometer may also comprise two fixed reflecting plates separated by a thin layer of air. In this case the reflective surface plates are mounted in a drum to ensure that they are parallel.

A Fabry-Perot type interferometer is characterized, among other things, by its free spectral range expressed in wavelengths, for example. The free spectral range is the distance between two transmission peaks of the interferometer. FIG. 3 shows these transmission peaks.

FIG. 3 shows the characteristics of a rotation tuned Fabry-Perot interferometer, for example. The wavelength is plotted on the abscissa axis and the intensity ratio $I/I_0$ on the ordinate axis. $I_0$ is the total optical intensity of the input optical signal and I is the intensity of the optical signal at the filter output.

This characteristic comprises a succession of transmission peaks with maximal intensity $I_1$ and minimal intensity $I_2$ and two adjacent transmission peaks are separated by a free spectral range representing a given wavelength difference. Two wavelengths of the input optical signal must be separated by at least the free spectral range (FSR) for the input optical signal to be filtered. The FSR expressed as a frequency is given by the equation:

$$FSR = \frac{c}{2nL \cdot \cos\theta r}$$

in which c is the velocity of light, n is the refractive index of the etalon, L is the thickness of the etalon and $\theta r$ is the angle of refraction of the optical signal inside the etalon. This angle of refraction depends on the angle of incidence of the input optical signal light ray and therefore on the interferometer rotation angle. If the rotation angle increases the angle of refraction also increases, $\cos \theta r$ decreases and the FSR (expressed in wavelengths) decreases. For a given input signal spectrum the output signal frequency therefore increases.

It can thus be seen that varying the angle of refraction amounts to varying the free spectral range. If the angle increases the FSR (expressed in wavelengths) decreases and the transmission peaks move towards the lower wavelengths.

The normalized intensity depends on the phase or the wavelength. In the case of a perfect Fabry-Perot interferometer (optimal parallelism, flatness and roughness) illuminated by a plane wave, it is expressed by the Airy function. This function is $2\pi$ periodic and extends across all of the spectrum. Thus displacement by one free spectral range covers all the input signal spectrum. For this reason the tunability of an optical filter comprising a Fabry-Perot type interferometer is defined by the range of wavelengths needed to move from one transmission peak to the next.

Another interferometer parameter is the ratio of the FSR to the spectral bandwidth (transmission peak width at mid-height).

Finally, the contrast factor C is equal to $-10 \log (I_2/I_1)$ where $I_1$ and $I_2$ are respectively the maximal and minimal transmitted intensity.

However, rotation of the etalon reduces the spectral bandwidth and the amplitude of the transmitted optical signals.

FIG. 4 shows a simulation of the variation in the amplitude and the spectral bandwidth of the transmission peak for different Fabry-Perot interferometer rotation angles.

The characteristics 40 through 43 show the transmission peaks at Fabry-Perot etalon rotation angles $\alpha$ of 0, 2, 4 and 6° when the filter is tuned to input optical signals of intensity $I_0$.

For normal incidence ($\alpha=0$) the transmission peak passes almost all of a selected wavelength, i.e. there is little attenuation. Also, the sides of the peak 40 are steep and this ensures good rejection of optical wavelengths adjacent that to which the filter is tuned (narrow spectral bandwidth).

For tuning with a rotation angle of 2° (characteristic 41), however, attenuation of the transmitted intensity is accompanied by spreading of the spectral bandwidth. This phenomenon becomes more accentuated as the angle $\alpha$ increases and causes crosstalk between closely adjacent channels.

To a first approximation (normalized unity amplitude channels of infinitely small spectral bandwidth), the crosstalk D is equal to $2 \cdot I_1/I_0$ where $I_0$ is the maximal intensity of the transfer function and $I_1$ is the intensity at a phase angle representing the position of the adjacent channel.

This crosstalk distorts the optical signals at the filter output and is shown by the curve 50 in FIG. 5. The interferometer rotation angle $\alpha$ in degrees is plotted on the abscissa axis and the crosstalk in percent on the ordinate axis.

Because of this crosstalk, if the optical signal is modulated by a digital signal significant closing of the eye pattern occurs for optical signals at wavelengths which require a large angle $\alpha$ to filter them when the optical signal density is high in the free spectral range and the transmission error rate increases.

To avoid this problem it is necessary to restrict the number of different wavelength channels in a given free spectral range. With a sufficiently wide gap between two adjacent wavelengths interchannel crosstalk can be limited and an acceptable error rate preserved.

One palliative measure is to increase the reflectivity of the Fabry-Perot etalon but this is accompanied by a decrease in the spectral bandwidth and so is not suitable for filtering input signals which have a variable spectral bandwidth. Using direct amplitude modulation, for example, spurious frequency modulation (chirp) can increase the spectral bandwidth of the channel to be filtered by a non-negligible amount.

The overall spectral bandwidth/free spectral range ratio can also be enhanced by using two Fabry-Perot filters in cascade. Increasing the spectral bandwidth/free spectral range ratio increases the resolution and therefore reduces crosstalk. Energy losses are doubled, however, and the spectral bandwidth is reduced. Thus this solution is no more suitable for optical signals having a significant spectral bandwidth. This solution is also more costly.

One object of the present invention is to remedy these drawbacks.

In more precise terms, one object of the invention is to reduce the crosstalk between a filtered channel and a channel near the filtered channel in order to reduce the error rate for transmission of optical signals in a system such as an optical switching system, for example. Any such reduction in crosstalk in the tunable range (FSR) would make it possible to enhance the contrast between the signals and thus the resolution of the filter.

Another object of the invention is to preserve a minimal spectral bandwidth over all of the tuning range, i.e. for different interferometer inclination angles.

SUMMARY OF THE INVENTION

The present invention consists in a rotation tuned optical filter comprising a Fabry-Perot type interferometer disposed between an optical source and an optical receiver wherein said interferometer filters an input optical signal from said optical source, said input optical signal propagates substantially in a single mode, said interferometer supplies a filtered optical signal to said optical receiver which comprises a receiving surface which integrates the power density of said filtered optical signal, and said filter comprises means for modifying the position of said filtered optical signal relative to said receiving surface of said optical receiver.

This can optimize the energy integrated by the receiving surface of the optical receiver.

In one preferred application of the invention the optical source comprises a monomode input optical fiber cooperating with a collimator lens and the optical receiver comprises a focussing lens cooperating with an output optical fiber, the surface of the core of the output optical fiber constituting the receiving surface.

This optimizes the transmission of energy of the filtered optical signal as a function of the interferometer rotation angle. This optimization is achieved by concentrating the maximum optical energy on the focussing lens so that the maximum energy is transmitted coaxially to the output optical fiber.

In a first embodiment of the invention the means for modifying the relative position of the filtered optical signal relative to the receiving surface of the optical receiver comprise a plate by which the filtered optical signal is refracted.

This plate is preferably at the same angle to the input optical signal as the interferometer.

In this case the plate and the interferometer are fixed relative to each other and the transmission characteristics are optimized over all of the tuning range, i.e. over all of the free spectral range. The filtered optical signal flux is the integral of the filtered optical signal power density.

In an alternative embodiment the angular position of the plate is fixed.

In this case preference is accorded to certain transmission peaks.

In a second embodiment the means for modifying the position of the filtered optical signal relative to the receiving surface comprise means for displacing the optical receiver relative to the interferometer.

This embodiment uses mechanical means for concentrating the maximal value of the filtered optical signal power density integral onto the focussing lens in the case where the invention is applied to filtering optical signals between input and output optical fibers. These mechanical means are used to displace the focussing lens and the output fiber in a direction perpendicular to the main axis of the filter.

The interferometer comprises either an etalon with treated surfaces or a set of two fixed airspaced plates.

The former solution has the advantage of ensuring perfect parallelism between the reflecting surfaces of the Fabry-Perot interferometer.

Other features and advantages of the invention will emerge from the following description of a preferred embodiment given by way of non-limiting illustrative example only with reference to the appended drawings.

DETAILED DESCRIPTION OF THE INVENTION

Figure 1:
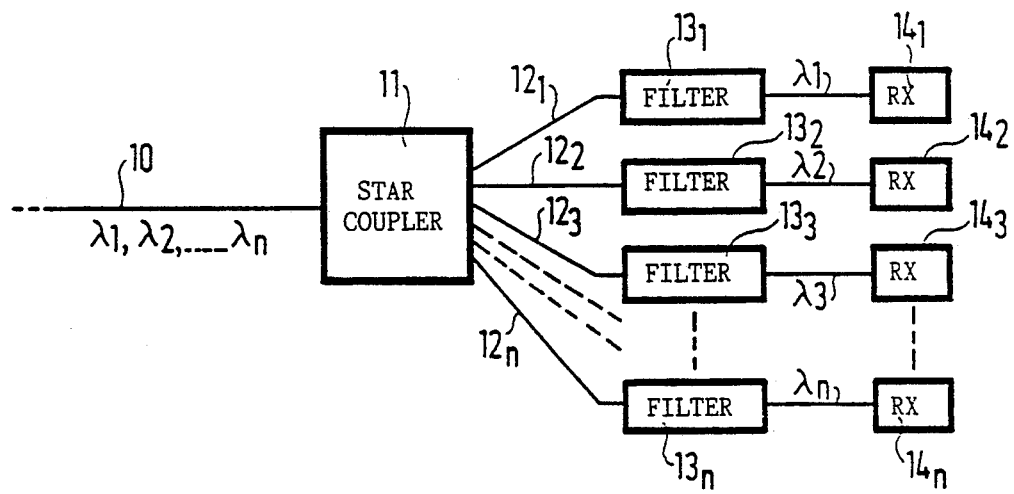
FIG. 1 shows the receive part of an optical transmission system using Fabry-Perot interferometers.
Figure 2:
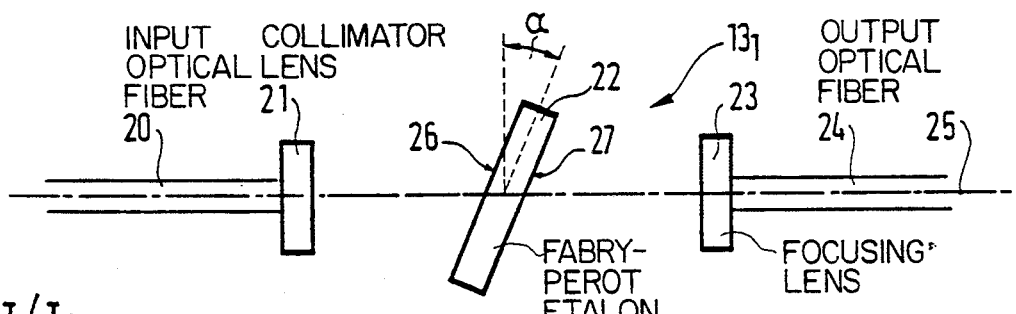
FIG. 2 shows a known Fabry-Perot interferometer disposed between two optical fibers.
Figure 3:
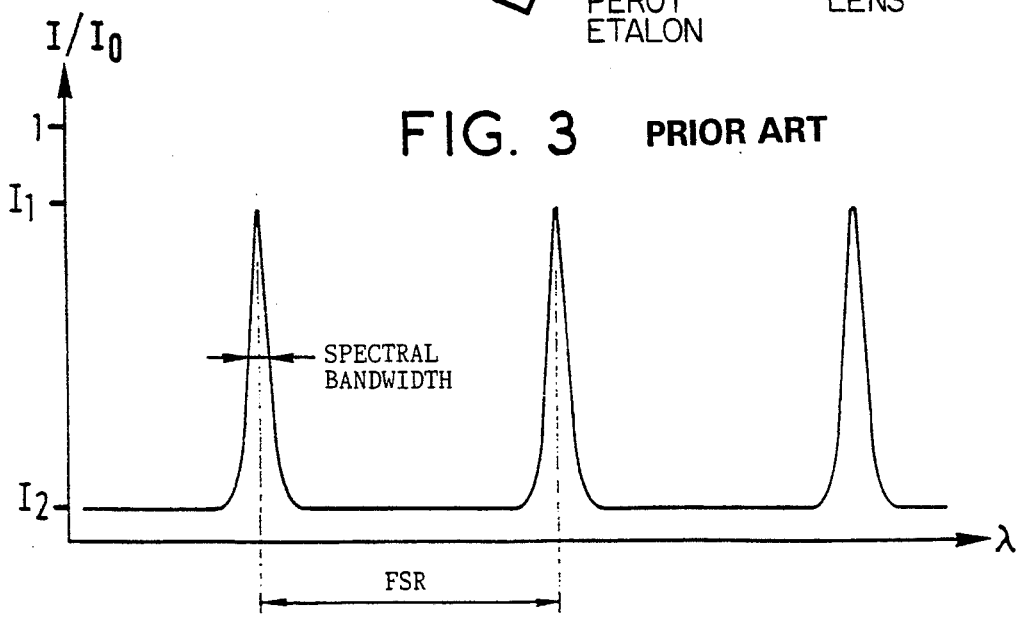
FIG. 3 shows the characteristic of a Fabry-Perot type filter, this characteristic comprising equidistant transmission peaks.
Figure 4:
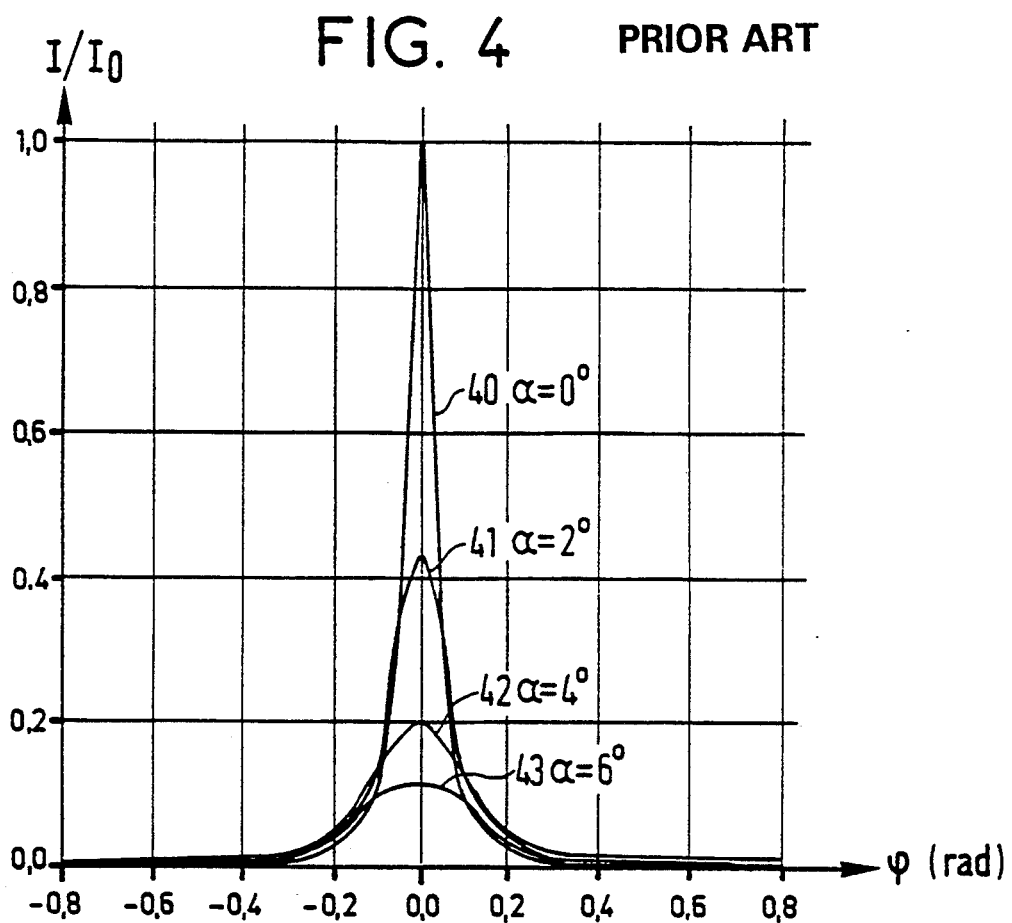
FIG. 4 shows a simulation of the variation in the amplitude and the spectral bandwidth of the transmission peak for different Fabry-Perot etalon rotation angles.

FIGS. 1 through 5 have been described already with reference to the prior art.

The invention consists in recovering at the interferometer output the maximum optical energy of a filtered signal in order to direct this energy onto the focussing lens associated with the output optical fiber. The interferometer shown in FIG. 6 comprises an etalon 22 (plate with treated surfaces).

It has already been shown that rotating the interferometer displaces the various transmission peaks relative to the spectrum of the input signal conveyed by the monomode fiber 20 cooperating with the collimator lens 21. The tuning of the filter to a given input signal wavelength can be modified by this displacement of the transmission peaks.

However, this rotation also spreads the optical energy, i.e. the spreading of the optical energy is proportional to the angle between the etalon 21 and a line perpendicular to the main axis 25 of the filter.

With a monomode input fiber the input signal optical energy has a Gaussian distribution and the filtered signal at the output of the etalon 22 thus comprises a sum of spatially spread Gaussian functions.

Using Cartesian coordinates, the normalized intensity of the optical signal at the input of the receiving fiber 24 may be expressed by the following equation, for example:

$$\frac{I}{I_0} = A \cdot \frac{\int_{-W_x}^{+W_x} \int_{-W_y}^{+W_y} F(x,y) \cdot \left[ \left( \sum_{p=1}^{\infty} U(p,x) \right)^2 + \left( \sum_{p=1}^{\infty} V(p,x) \right)^2 \right] dS}{\int_{-W_x}^{+W_x} \int_{-W_y}^{+W_y} F_0(x,y) dS}$$

in which:

A is a constant representing the refraction of the Gaussian function at the entry to the input fiber and the transmission coefficient;

$F_0(x,y)$ represents the Gaussian distribution of the optical intensity entering the interferometer;

$F(x,y)$ is a spatial term independent of the phase difference;

$U(p,x)$ and $V(p,x)$ are terms dependent on the reflectivity, the phase difference and the spatial offset of the Gaussian functions;

$W_x$ and $W_y$ respectively denote the radii of the focussing and collimator lenses, the focussing lens being usually coaxial with the collimator lens and at the center of the interferometer.

Figure 7:
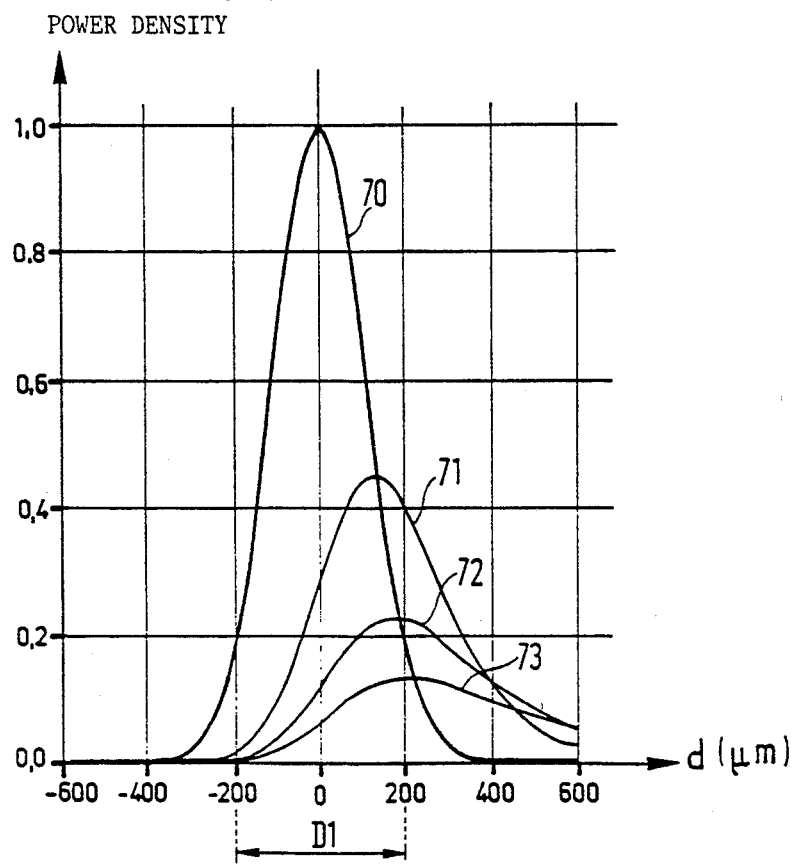
FIG. 7 shows the interferometer output power density for different interferometer rotation angles.

This sum of Gaussian functions represents a power density as shown in FIG. 7.

FIG. 7 shows a simulation of the variation in the interferometer output power density for different interferometer rotation angles. The interferometer comprises a treated surface etalon having a reflectivity of 97%, the free spectral range being 5.5 nm. The maximum difference between the wavelengths of the signals constituting the input signal must therefore be less than 5.5 nm.

The curves 70 through 73 respectively represent the etalon output power density for etalon rotation angles of 0, 2, 4 and 6°. A distance d (in μm) representing the distance of points of the power density envelope relative to the main axis 25 (FIG. 6) is plotted on the abscissa axis. The power density is plotted on the ordinate axis. These curves were obtained for a zero etalon output Gaussian function optical phase difference, modulo 2π, i.e. the Gaussian functions are in phase (maximum energy transmission). Each therefore represents a wavelength tuned position.

Note that for a rotation angle of 0° (curve 70) the energy density maximum is equal to 1 and is on the main axis 25. Also, the distribution is symmetrical. All Gaussian type interferences are in this case centered on the main axis 25 and sum constructively.

For a rotation angle of 2° there is significant attenuation of the optical power density due to the characteristics of the etalon. Note also a spatial displacement of the power density maximum off the main axis (reference 0 on the abscissa axis). The focussing lens 23 has a limited diameter D1 (FIG. 7) in the order of 400 μm, for example. With a null etalon rotation angle (curve 70) the power density impinging on the focussing lens is high. For a rotation angle of 2°, however, the power density impinging on the focussing lens is strongly reduced. There follows a loss of optical power because some light misses the focussing lens and is therefore not applied to the surface of the core of the output optical fiber 24. The optical energy integrated by the receiving surface (core) of the output optical fiber 24 is thus reduced.

This phenomenon increases in proportion to the inclination of the etalon, as shown by the curves 72 and 73.

The spatial spreading of the power density is also accompanied by a modification to the energy distribution: for high rotation angles this distribution is no longer Gaussian but tends to spread as shown by the curves 72 and 73. High rotation angles produce asymmetric power densities.

For a null rotation angle (curve 70) the multiple reflections remain concentric and there is no spreading or asymmetry.

The spatial spreading is due entirely to the rotation of the etalon and because of it the maximum value of the power density integral (i.e. the maximum optical flux of the filtered optical signal available at the output of the focussing lens 23) is not integrated into the core of the output optical fiber 24. Even if the diameter of the focussing lens 23 is increased, the numerical aperture of the output optical fiber core remains limited and this increases the transmission error rate.

The spreading and distortion of the power density envelope for a null phase difference are additionally accompanied by a displacement of the optical power density maximum towards the main axis as the etalon rotation angle increases for non-null phase differences (i.e. when untuned).

Figure 8:
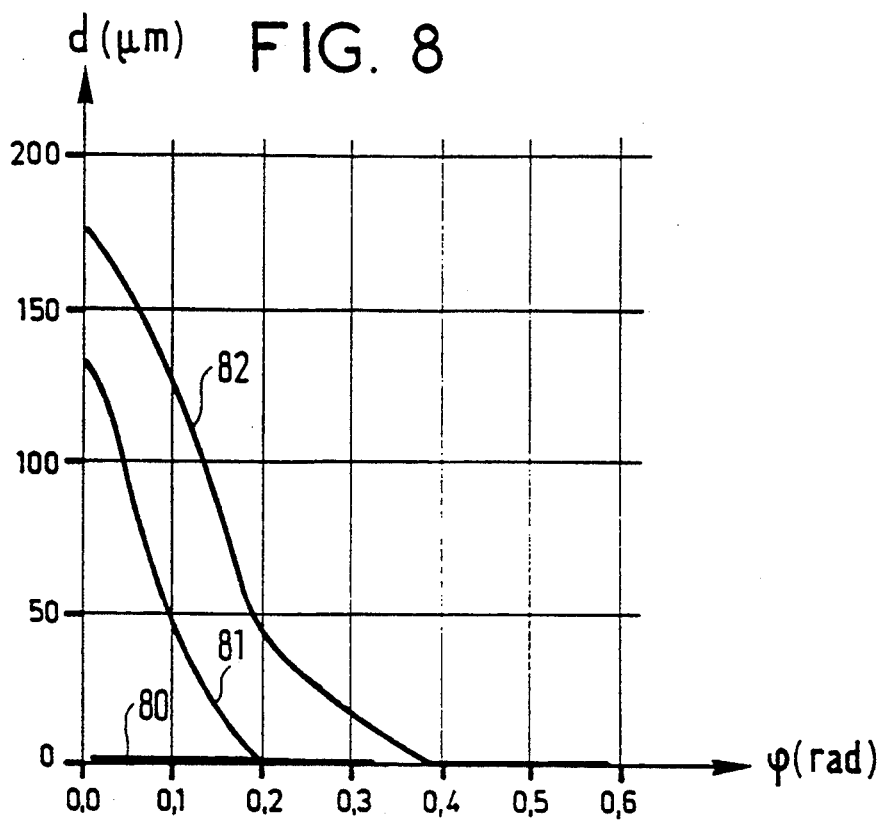
FIG. 8 shows a simulation of the variation in the position of the optical power density maximum relative to the main axis of the optical filters as a function of the interferometer rotation angle for untuned wavelengths.

FIG. 8 shows this phenomenon. It comprises three curves 80, 81, 82 showing the respective position (in μm) of the optical power density maximum and the output of the etalon 22 as a function of the optical path difference in radians for rotation angles of the etalon 22 of 0, 2 and 4°.

These curves were obtained by simulation and show that with non-null phase an undesirable optical power density is concentrated in the output fiber. For an etalon rotation angle of 4°, for example, a power density maximum is located at the center of the focussing lens 23 for an optical path difference of 0.4 radians. This optical power density maximum, which is concentrated into the core of the output optical fibre and integrated therein, constitutes a spurious signal if the frequency channels of the input optical signal are very close together. This phenomenon is accentuated as the etalon rotation angle increases.

Thus two phenomena tend to limit the performance of an optical filter:
  in the tuned situation, the energy density maximum is displaced perpendicularly to the main axis of the optical filter, the output optical fiber cannot integrate the maximum optical flux and the filtered signal optical intensity is accordingly reduced,
  if the filtered optical signals are not in phase, i.e. if there is by design a phase difference between the filtered signals to eliminate a signal at a wavelength close to that of a filtered signal, the energy density maximum of the channel to be eliminated moves towards the main axis of the filter and this causes poor rejection of channels adjacent the filtered channel.

The combination of these two problems increases crosstalk.

The present invention proposes to provide means for compensating for the displacement of the power density integral maximum relative to the main axis of an optical filter in order to recenter this maximum in the receiving pupil and therefore in the core of the output optical fiber. These means thus constitute means for correcting the position of the filtered optical signal relative to the output optical fiber.

Figure 6:
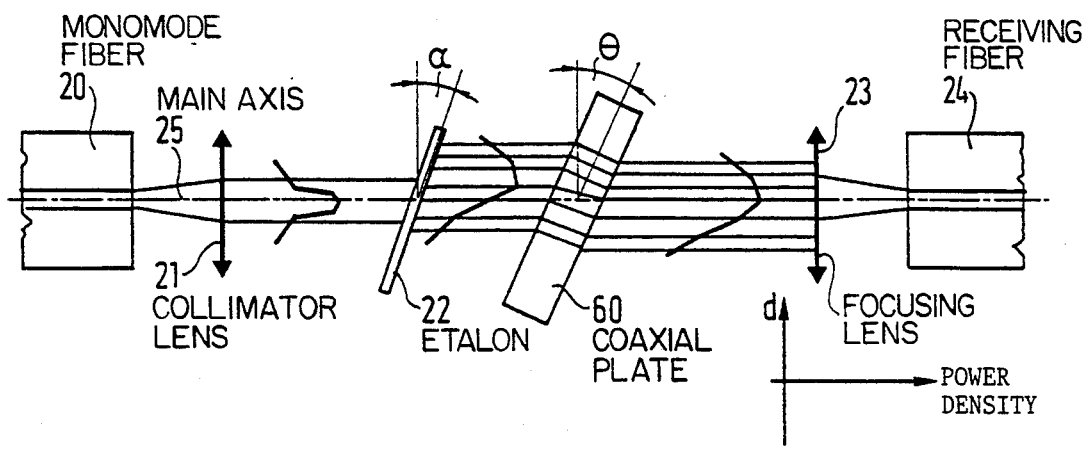
FIG. 6 shows a preferred embodiment of the optical filter of the present invention.

In the FIG. 6 embodiment recentering is achieved by a coaxial plate 60 which refracts the filtered optical signals so that the optical energy maximum due to the sum of the aforementioned Gaussian distributions is moved onto the main axis 25 of the filter. To achieve this the plate 60 is inclined at an angle $\theta$.

The refraction of the filtered optical signal concentrates the filtered optical flux maximum value in the core of the output fiber 24. This is equivalent to moving the focussing lens and the associated output fiber, whose diameter D1 is shown in FIG. 7, so that the latter receives the optical power density maximum. In this embodiment all components are centered on the same main axis 25.

The rotation angle $\theta$ of the coaxial plate 10 can be optimized for a given wavelength to be filtered by measuring the total power of the signal in the output optical fiber 24.

The plate 60 shown is disposed between the etalon 22 and the focussing lens 23 but may equally well be placed between the collimator lens 21 and the etalon 22. Its position is not critical. However, the optical fiber conveying the input signal must be a monomode fiber so that the input optical signal has a Gaussian distribution. The output optical fiber 24 may be a monomode or multimode fiber. If it is a monomode fiber the optical filter is symmetrical and bidirectional transmission is possible.

If the plate 60 moves with the etalon 22, i.e. if $\theta=\alpha$, the correction is applied over all the tunable range of the optical filter. If it is fixed, however, some wavelengths of the input signal are favored over other wavelengths.

In a second embodiment the focussing lens 23 and the associated output fiber 24 which is glued to the lens 23, for example, cooperate with displacement means for modifying their position relative to the main axis 25.

The displacement means may comprise, for example, a rack whose movement perpendicular to the filter main axis is geared down and driven manually, for example. In this case the compensator plate 60 is not used and the main axis becomes the bearer axis of the wave vector emerging from the collimator lens 21.

Figure 9:
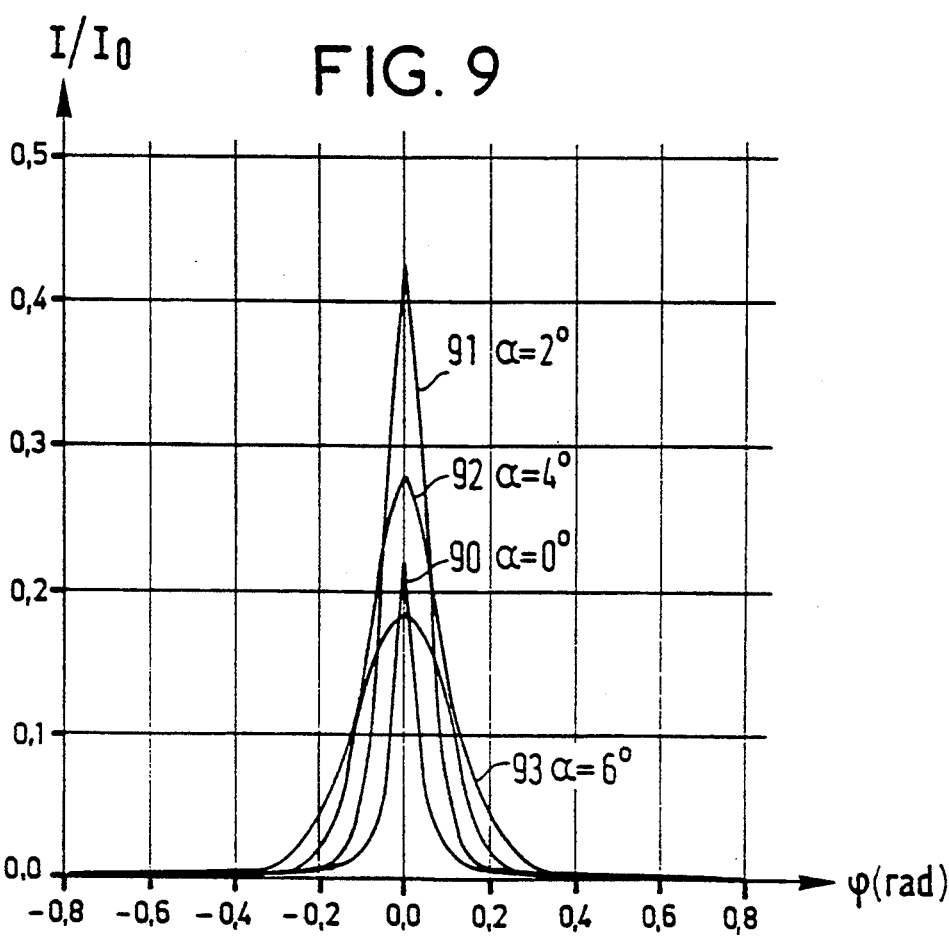
FIG. 9 shows a simulation of the variation in the characteristics of an optical filter comprising a compensator plate in accordance with the invention.

The correction achieved by the present invention may be gauged from FIG. 9.

FIG. 9 shows a simulation of the variation in the characteristics of an optical filter comprising a compensator plate in accordance with the invention. The characteristics 90 through 93 respectively represent the output optical intensity I relative to the total optical intensity $I_0$ of an input signal for rotation angles 0, 2, 4 and 6°. These characteristics should be compared with those of FIG. 4 which were obtained with no compensator plate.

Note a clear reduction of the peak for $\alpha=0°$ (curve 90) due to reflection at the compensator plate when the incident signal is normal to the etalon surface. This is not a problem because in real use a null rotation angle is avoided to prevent problems arising from reflection towards the emitting sources. It is therefore desirable to eliminate the compensator means in accordance with the invention in instances where normal incidence is used.

For $\alpha=2°$ (curve 91) the attenuation is substantially the same as that obtained with no compensator plate and the spectral bandwidth is narrower. The transmitted optical signal power is therefore substantially the same but the rejection of wavelengths adjacent the filtered wavelength is significantly improved.

For $\alpha=4°$ (curve 92) the attenuation of the filter is much lower than that of the same filter with no compensator plate and the spectral bandwidth is also narrower. This phenomenon is accentuated for an etalon rotation angle $\alpha$ of 6° (curve 93).

Figure 5:
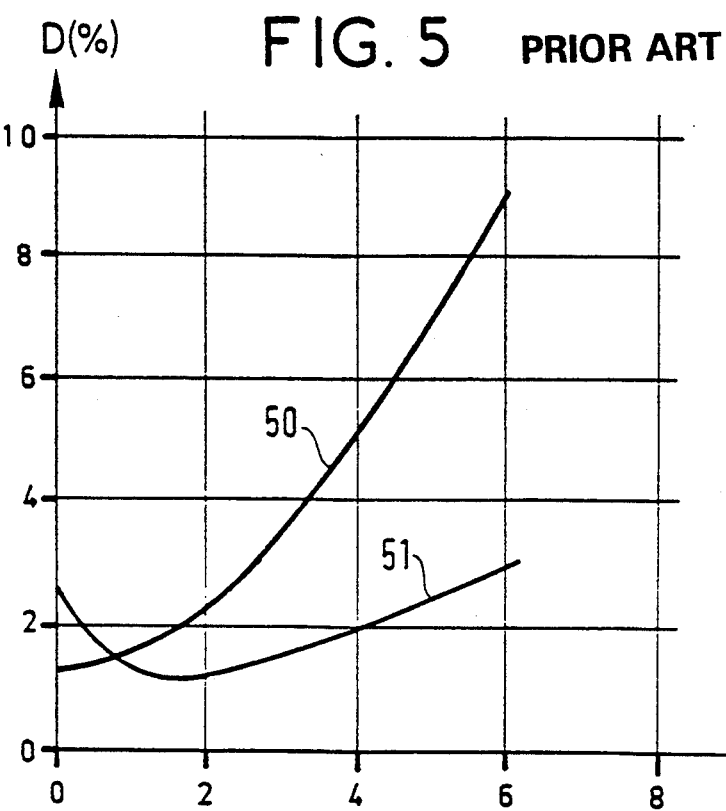
FIG. 5 shows the variation in interchannel crosstalk as a function of the interferometer rotation angle.

The curve 51 in FIG. 5 shows the variation in the crosstalk using a compensator plate in accordance with the invention. The correction achieved by the refracting plate enables the crosstalk to be significantly improved. Note the rotation of the crosstalk characteristic. For a null angle the energy integrated in the core of the receiving fiber is reduced but the transmission peak is not distorted (see FIG. 9). The various wavefronts at the etalon output remain concentric and the offset due to refraction does not change the number of constructive interferences (or changes it very little). Thus the crosstalk for a given channel spacing is degraded only very slightly.

Measurements have been carried out using a 97% reflectivity etalon, a wavelength of 155 nm and a free spectral range of 5.5 nm. The gain achieved was 6 dB over all the tunable range.

Overall, the non-null phase energy integrated outside the spectral bandwidth is less than that integrated with no compensator plate and the energy density resulting from constructive interferences recentered on the focussing lens is increased. The wanted energy confinement is thus enhanced and the null phase transmission gain is increased, with distortion of the peak slightly reducing the spectral bandwidth. The sides of the peak are steeper and this improves the rejection of energy at out-band frequencies.

The collimator and focussing lenses are graded index lenses respectively glued to the input and output optical fiber, for example. The glueing is done in such a way as to preserve the focal length between the fiber core and the lens plane.

If a refracting plate is used, it is preferably anti-reflection treated. Any defects in the parallelism of the plate surfaces are compensated by the plate rotation angle $\phi$.

Of course, the interferometer could equally well comprise a set of two airspaced plates fastened into a drum, for example. In this case only the surfaces of the plates which are separated by the layer of air are treated to confer some reflectivity.

The main benefit of the improvement in performance is the possibility to increase the number of channels in a wavelength division demultiplexing optical system. The reflectivity of the interferometer can be restricted in order not to penalize transmission at values exceeding around 98% over all the tunable range.

Of course, the present invention is not limited to the application described hereinabove, i.e. to filtering optical channels of an input signal conveyed by a monomode input fiber. Generally speaking, the monomode input fiber and the collimator lens associated with a light source constitute an optical source supplying an input optical signal propagating in a single mode. This optical source may be replaced with an integrated optical waveguide, comprising for example a hybrid structure silica guide comprising a laser emitter, one or more light amplifiers, etc. Likewise, the output optical fiber is part of an optical receiver which may be replaced by a detector photodiode. The surface of the detector photodiode is then the surface which integrates the power density of the filtered optical signal and detection is optimized by modifying the position of the filtered optical signal relative to this receiving surface.

There is claimed:

1. Rotation tuned optical filter comprising a Fabry-Perot type interferometer disposed between an optical source and an optical receiver wherein said interferometer filters an input optical signal from said optical source, said input optical signal propagates substantially in a single mode, said interferometer supplies a filtered optical signal to said optical receiver which comprises a receiving surface which integrates the power density of said filtered optical signal, and said filter comprises means for modifying the position of said filtered optical signal relative to said receiving surface of said optical receiver.

2. Optical filter according to claim 1 wherein said optical source comprises a monomode input optical fiber cooperating with a collimator lens, said optical receiver comprises a focussing lens cooperating with an output optical fiber and the surface of the core of said output optical fiber constitutes said receiving surface.

3. Optical filter according to claim 1 wherein said means for modifying the position of said filtered optical signal relative to said receiving surface of said optical receiver comprise a plate whereby said filtered optical signal is refracted.

4. Optical filter according to claim 3 wherein said plate and said interferometer are at the same angle to said input optical signal.

5. Optical filter according to claim 3 wherein said plate has a fixed angular position.

6. Optical filter according to claim 1 wherein said means for modifying the position of said filtered optical signal relative to said receiving surface comprise means for displacing said optical receiver relative to said interferometer.

7. Optical filter according to claim 1 wherein said interferometer comprises a treated surface etalon.

8. Optical fiber according to claim 1 wherein said interferometer comprises a set of two fixed airspaced plates.

* * * * *